March 19, 1935. G. E. GAUS 1,994,947
APPARATUS FOR AFFIXING IDENTIFICATION TAGS
Filed Dec. 16, 1932
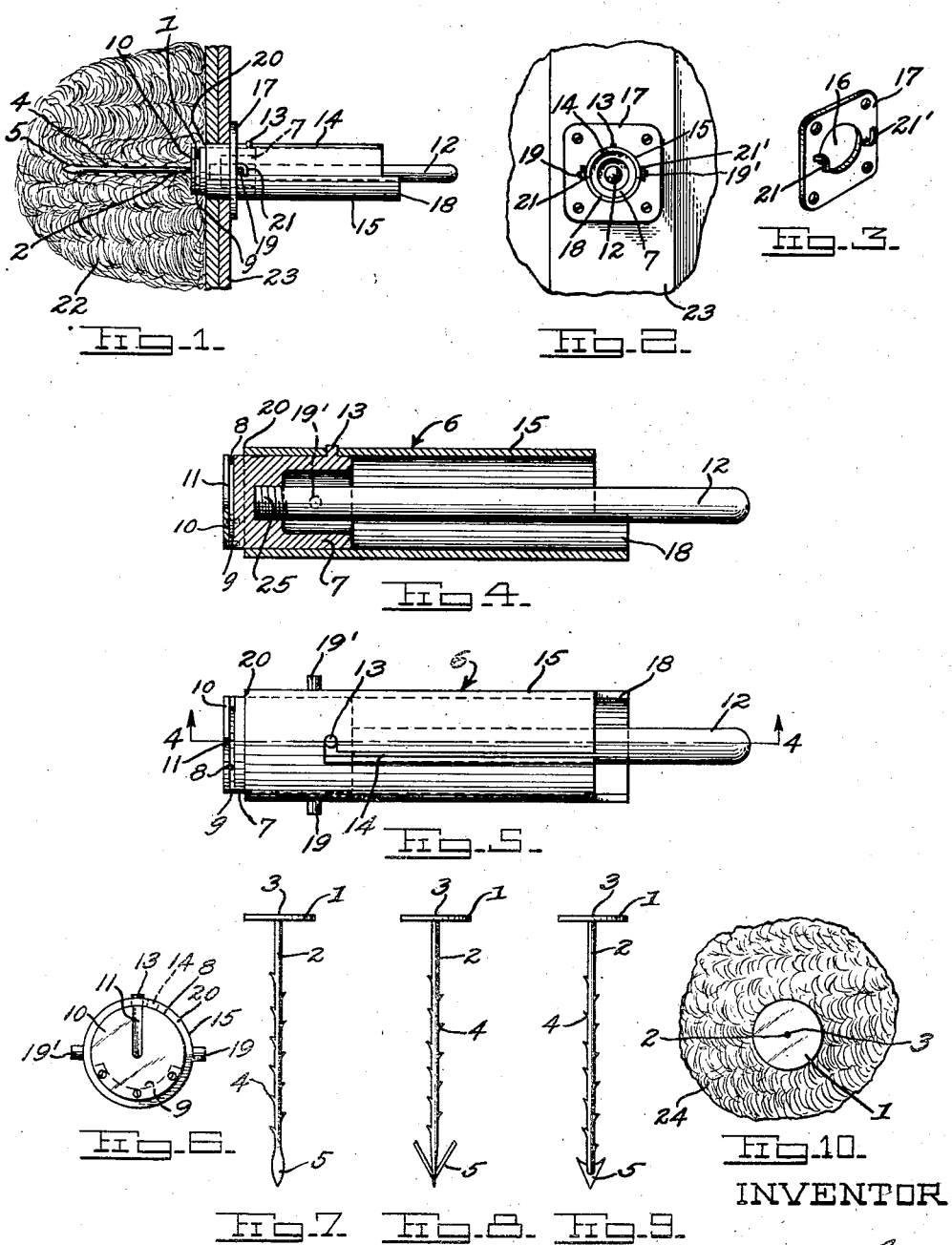
INVENTOR
George E. Gaus
By: [signature]
Attorney Patented Mar. 19, 1935

1,994,947

UNITED STATES PATENT OFFICE 1,994,947

APPARATUS FOR AFFIXING IDENTIFICATION TAGS

George E. Gaus, Washington, D. C.; dedicated to the free use of the Government and the people Application December 16, 1932, Serial No. 647,599

1 Claim. (Cl. 100—14)

(Granted under the act of March 3, 1883, as amended April 30, 1928; 370 O. G. 757)

This application is made under act of March 3, 1883, as amended by the act of April 30, 1928, and the invention herein described may be manufactured and used by or for the Government for governmental purposes without the payment to me of any royalty thereon.

I hereby dedicate this invention to the free use of the Government and the people of the United States.

My invention relates to affixing identification tags to bales of fibrous materials, particularly cotton, whereby the particular bales to which the tags have been applied, may be identified in event the customary means of identification are effaced, destroyed, or changed and has for its object to provide a simple method for inserting within the bale during the process of baling a durable identification tag, arranged in such a manner that it cannot readily be removed or replaced after the material has been baled.

In order to carry out the purposes of my invention, reference is to be had to the peculiar combinations and arrangement of parts as shown in the accompanying drawing, forming a part of this specification, in which similar numerals refer to similar parts throughout the several views.

Figure I is a cross-section of an area of a conventional type of press-box, illustrating the tag injector assembly attached to the exterior of the conventional type of press-box side, and the identification tag assembly, depicted in position in the fibrous material, prior to its release from the ram of the tag injector.

Figure II is an end view of the tag injector assembly attached to the exterior of a section of the conventional type of press-box side.

Figure III is a perspective view of the lock plate for attachment of the tag injector assembly to the press-box side.

Figure IV is a sectional view of the tag injector assembly.

Figure V is a plan view of the tag injector assembly.

Figure VI is an end view of the tag injector assembly.

Figures VII, VIII, and IX illustrate the identification tag assembly using different means for providing anchorage of the tag shank within the baled material.

Figure X illustrates an area of the side of the completed baled material with the tag head of the marker or identification tag visible on the outer surface of the bale.

Tag head 1, of convenient shape and size, visible on the outer surface of bale 24, is firmly attached, by any conventional means, to shank 2, at its center 3. Shank 2 may be of suitable metallic or nonmetallic material, said shank 2 is provided with an anchoring assembly 4. By referring to Figures VII, VIII, and IX, shank 2 is provided with the various types of anchoring assemblies, which may consist of barbs 4, as shown, or may be omitted. The essential features of the anchorage assembly being barbs 4 in Figure VII and points 5 in Figures VIII and IX.

Ram 7, of tag injector assembly 6 (Figs. I, IV, and V) used in embedding shank 2, into fibrous material 22 has recess 8 to receive tag head 1, resting on shoulder 9, confined within the recessed area by retainer plate 10 having slot 11, cut to the center of retainer plate 10, of sufficient width to permit free passage of shank 2. The assembled features comprising recess 8 and retainer plate 10 are so disposed with ram 7 that the identification tag assembly 1—2, may be inserted in the recessed area manually and discharged therefrom automatically with the vertical movement of fibrous material 22, during the conventional process of baling, as hereinafter described. Handle 12 is attached by means of screw threads 25 to ram 7 for the purpose of imparting motion to ram 7. Lock pin 13 is so located on ram 7 that when locked in position in bayonet slot 14 (Fig. V) slot 11 in retainer plate 10 (Fig. VI) is in a vertical position with reference to the up or down movement of fibrous material 22 during the process of compression. Removable sleeve or guide-tube 15 (Figs. IV and V) enters aperture 16 in lock plate 17 (Figs. I and III), coinciding with an aperture in press-box side 23, below the center line of the completed bale. This aperture in press-box side 23 permits the insertion of the identification means during the process of baling. Guide-tube 15 (Figs. IV and V) has projection 18 to facilitate the insertion of the ram assembly. Lock pins 19 and 19′ diametrically opposed to each other, are so mounted on guide-tube 15 that the end 20 of guide-tube 15 will be flush with the inside wall of press-box side 23 when pins 19 and 19′ are engaged with ears 21 and 21′ of lock plate 17.

My invention may be practiced when the required quantity of fibrous material 22 has been fed into the press-box ready for formation of the bale by the conventional means of compressing the material, by locking guide-tube 15 in position in lock plate 17 by means of pins 19 and 19′ in engagement with ears 21 and 21′. Ram 7, with identification assembly 1—2, point 5 foremost, in position in recess 8 (Fig. I) is fed into guide-tube 15. Shank 2 is forced full length into bale material 22 through aperture in press-box side 23 by imparting with handle 12 a ramming or jogging motion to ram 7. Pin 13 travels in bayonet slot 14. Ram 7 is locked at the end of travel in bayonet slot 14, holding slot 11 in retainer plate 10 in a vertical position with respect to the movement of fibrous material 22 during compression. Upon compression of bale material 22, the vertical movement caused thereby lifts shank 2 out of slot 11 in retainer plate 10. This compression also forces bale material 22 in intimate contact with anchoring means 4—5 of shank 2, thereby arresting removal of identification assembly 1—2 from the completed bale. Tag head 1 appears in the mid-area of the side of the bale not covered by the bale covering or tare.

While the foregoing is a preferred embodiment of the means for practicing my invention, I do not wish to be restricted thereto.

Having thus described my invention, I claim as new and desire to secure by Letters Patent:

An apparatus of the character described in combination with a baling press for fibrous material having an opening formed in the side wall thereof together with an attachment means for removably mounting said apparatus, said apparatus comprising a sleeve, securing means on said sleeve, a rammer slidably housed within said sleeve, a slotted plate mounted on the butting end of said rammer and in spaced relation thereto thereby forming a tag receiving recess between the plate and rammer end, and cooperating means within said sleeve and on said rammer to position and retain the slot in said plate in the plane of movement of the fibrous material during the formation of a bale.

GEORGE E. GAUS.